United States Patent
Irwin et al.

(10) Patent No.: US 9,891,632 B1
(45) Date of Patent: Feb. 13, 2018

(54) POINT-AND-SHOOT AUTOMATIC LANDING SYSTEM AND METHOD

(71) Applicant: THE BOEING COMPANY, Chicago, IL (US)

(72) Inventors: Joseph G. Irwin, Philadelphia, PA (US); Bryan E. Kashawlic, Philadelphia, PA (US); Brandon R. Brown, Philadelphia, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/237,433

(22) Filed: Aug. 15, 2016

(51) Int. Cl.
  *G05D 1/10* (2006.01)
  *B64D 43/00* (2006.01)
  *G05D 1/04* (2006.01)
  *G05D 1/00* (2006.01)

(52) U.S. Cl.
  CPC ............ *G05D 1/101* (2013.01); *B64D 43/00* (2013.01); *G05D 1/0061* (2013.01); *G05D 1/042* (2013.01)

(58) Field of Classification Search
  CPC ...... G05D 1/101; G05D 1/0061; G05D 1/042; G05D 1/0676; B64D 43/00
  See application file for complete search history.

(56) References Cited

U.S. PATENT DOCUMENTS

| | | | | |
|---|---|---|---|---|
| 3,610,821 | A * | 10/1971 | Narbaits-Jaureguy . | G01C 5/005 244/1 R |
| 6,216,065 | B1 * | 4/2001 | Hall ..................... | G01C 21/005 342/29 |
| 6,885,917 | B2 | 4/2005 | Osder et al. | |
| 7,642,929 | B1 | 1/2010 | Pinkus et al. | |
| 8,554,395 | B2 | 10/2013 | Andersson | |
| 2012/0314032 | A1 * | 12/2012 | Muensterer ......... | G01C 23/005 348/46 |

FOREIGN PATENT DOCUMENTS

| CN | 101976078 | * | 2/2011 |
|---|---|---|---|
| GB | 1572474 | * | 7/1980 |

* cited by examiner

*Primary Examiner* — Michael J Zanelli
(74) *Attorney, Agent, or Firm* — Francisco A. Rubio-Campos; Apogee Law Group P.C.

(57) ABSTRACT

A point-and-shoot automatic landing system (P-A-S ALS) realizes safety and mission effectiveness benefits in vertical takeoff and landing (VTOL) aircraft, allowing a pilot, using an inceptor device, to select an aim point with an aiming device providing visual indication of the aim point. Once a flight path is computed the pilot may allow the P-A-S ALS to automatically control the flight to touchdown. A suite of ranging devices determines the relative position of the aircraft to the selected aim point and an approach profile guidance algorithm computes the flight path. One or more devices provide confirmation that automatically controlled flight to the selected aim point is achievable. The P-A-S ALS is configured to allow termination of the controlled flight path at any time and selection of a new aim point through the inceptor device.

20 Claims, 7 Drawing Sheets

POINT-AND-SHOOT AUTOMATIC LANDING SYSTEM AND METHOD

STATEMENT REGARDING FEDERALLY SPONSORED RESEARCH OR DEVELOPMENT

This invention was made with United States Government ("USG") support under Contract Number H92241-11-D-0001-0001-0007 awarded by the Department of Defense. The USG has certain rights in the invention.

BACKGROUND

1. Field

The present disclosure is generally related to automatic landing systems for aircraft and more particularly, to a point-and-shoot automatic landing system for aircraft.

2. Related Art

Many fixed-wing aircraft feature autopilot systems and pilot-aids for takeoffs and landings. The primary purpose of such systems is to enhance the capability for and the safety of takeoff and landing. In the case of rotary-wing aircraft, operational conditions in secluded locations have led to the need for the Degraded Visual Environment (DVE) operating capabilities. This refers to flight operations under severe conditions where downwash generates a cloud of airborne dust, sand, snow, debris, and other obscurants that may partially reduce or fully impair the pilot's ability to see outside the aircraft. Inability to see outside removes important visual cues for the pilot to control aircraft attitude, speed, altitude, and clearance to terrain features and obstacles. The loss of pilot visual cues in DVE is compensated for using navigation sensors, graphical displays of information, and automatic control of vehicle attitude, speed, and altitude.

In general, any equipment that reduces pilot workload or improves pilot situational awareness during critical phases of flight can result in safer operation with greater probability of mission success. One example is the replacement of mechanical needle-based flight instruments with multi-function and moving map displays, which may include various gauges, symbols, and text that indicate sensor data and system status to the pilot.

An example of such equipment may be found in the U.S. Army's advanced model CH-47F Chinook, which has digital avionics with large color displays interfacing with a Digital Automatic Flight Control System (DAFCS). These systems provide an autopilot function that allows pilots to program an approach profile to a waypoint prior to takeoff or during the flight using a keypad. Programming an approach profile to a waypoint may include the following steps:
  a. The pilot keys-in GPS coordinates of a hover point (17 keystrokes);
  b. The pilot keys-in GPS coordinates of a final approach fix (17 keystrokes);
  c. The pilot keys-in glideslope (2 keystrokes or more);
  d. The pilot keys-in hover altitude (3 keystrokes or more);
  e. The pilot keys-in terrain altitude (2 keystrokes or more);
  f. Once in-flight, the pilot may engage visual steering cues made available to the pilot via a multi-function display (MFD) in the cockpit, to execute the programmed approach (3 buttons);
  g. The pilot makes flight control inputs to satisfy visual steering cues;
  h. The pilot may optionally engage the autopilot to keep visual steering cues satisfied (1 button); and
  i. The pilot may terminate the preprogrammed mission at any time (1 button).

There are several drawbacks with this traditional autopilot concept, with primary drawbacks being that the process requires extensive programming in advance of performing a maneuver and inability to alter parameters during the maneuver. While this may be acceptable in the case of fixed-wing aircraft that fly stabilized approach profiles at a constant airspeed and a constant flight-path-angle to a desired touchdown point on a prepared runway, in the case of vertical takeoff and landing (VTOL) aircraft, i.e., rotary-wing helicopters and other powered-lift aircraft capable of hovering, a VTOL approach is highly dynamic with changing airspeed, changing engine power demand, changing flight path, and changing angle-of-attack. Thus the VTOL approach may trace either a line or an arc through the sky to a touchdown or hover point, and manually performing such an approach requires pilot inputs in all four primary axes of control to both cause and compensate for the changing conditions. Moreover, the VTOL aircraft landing in confined, unprepared, landing zones without fences may discover other vehicles or obstructions fouling the intended aim point upon arrival and therefore may be forced to divert to an alternate location in the immediate vicinity.

To realize the safety and mission effectiveness benefits of fixed-wing transports in VTOL aircraft, there is a need for an improved point-and-shoot automatic landing system that provides a pilot of an aircraft with the capability of quickly selecting an aim point while in-flight, and once selected, the navigation systems of the aircraft will automatically guide the aircraft to that selected aim point, while still allowing the pilot to repeatedly change the aim point and to adjust or override automatic flight control inputs. The pilot may be physically located inside the aircraft or remotely located when controlling an Unmanned Aerial Vehicle (UAV).

SUMMARY

A point-and-shoot automatic landing system ("P-A-S ALS") and method of utilizing the P-A-S ALS are disclosed. In general, the P-A-S ALS comprises:
  a. An inceptor device to receive force inputs from a pilot for selecting an aim point that represents the termination of a planned mission segment;
  b. An aiming device that shows the pilot the selected aim point;
  c. A ranging device to determine the aircraft's position relative to the selected aim point;
  d. An approach profile guidance algorithm that governs the aircraft's altitude, speed, and direction into the selected aim point based on ranging device input; and
  e. One or more devices that confirm deceleration to landing at the selected aim point is possible.

The inceptor device receives force inputs from the pilot that command movement of an aim point symbol to the desired aim point. Example inceptor devices may include:
  a. Primary flight control sticks;
  b. A dedicated secondary control joystick;
  c. A trackball;
  d. A mouse; and
  e. A four-way switch to slew the desired aim point.

The aiming device provides visual indication of the selected aim point to the pilot. Example aiming devices may include:

a. A gimbaled laser pointer directed at the selected aim point and viewable outside the aircraft;
b. A camera directed at the selected aim point and displayed inside the aircraft; and
c. A mark on an overhead moving-map display inside the aircraft.

The ranging device detects distance, azimuth, and elevation from the aircraft to the selected aim point. Alternatively, multiple sensors may provide the geometric equivalent. Example ranging devices may include:

a. Laser range finders;
b. Radar range finders;
c. Radar altimeters limited to operation over flat terrain; and
d. Radar altimeters combined with digital terrain elevation data.

The approach profile guidance algorithm calculates the desired flight path to the selected aim point utilizing aiming commands generated from the aiming device and ranging device data. The approach profiles may have fixed or programmable characteristics. In an example implementation, the approach profiles may comprise horizontal and vertical commands that include horizontal groundspeed and vertical velocity commands that may be computed from ranging device distance and elevation data, respectively. A commanded ground track may be computed from ranging device azimuth data. A radar altimeter may be used to compute a vertical velocity command during a final vertical descent to landing at the selected aim point. Example approach profiles may include:

a. Constant flight path angles;
b. A constant vertical speed;
c. A constant deceleration rate of horizontal groundspeed; and
d. Combinations of the above.

The approach profiles may have fixed or programmable characteristics which may be entered into the P-A-S ALS by the pilot through a keypad, touch screen, buttons, or soft (configurable) buttons. Example programmable characteristics may include:

a. Flight path angle;
b. Profile vertical speed;
c. Vertical deceleration rate;
d. Horizontal deceleration rate; and
e. Vertical speed at touchdown.

Once the P-A-S ALS determines an approach to the selected aim point is achievable, the pilot may relinquish control to the P-A-S ALS all the way to landing at the selected aim point, or in the alternative, hovering above the selected aim point or tracking a moving aim point. At any time during an approach, the pilot may terminate the approach and select a new aim point, whereupon the P-A-S ALS will immediately compute an approach profile to the new aim point and control the aircraft into that aim point. If the pilot attempts to select an aim point that is not achievable, then the P-A-S ALS may provide immediate feedback to the pilot. Example feedback devices may include:

a. Tactile cues from the inceptor;
b. Visual indication; and
c. Aural indication.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
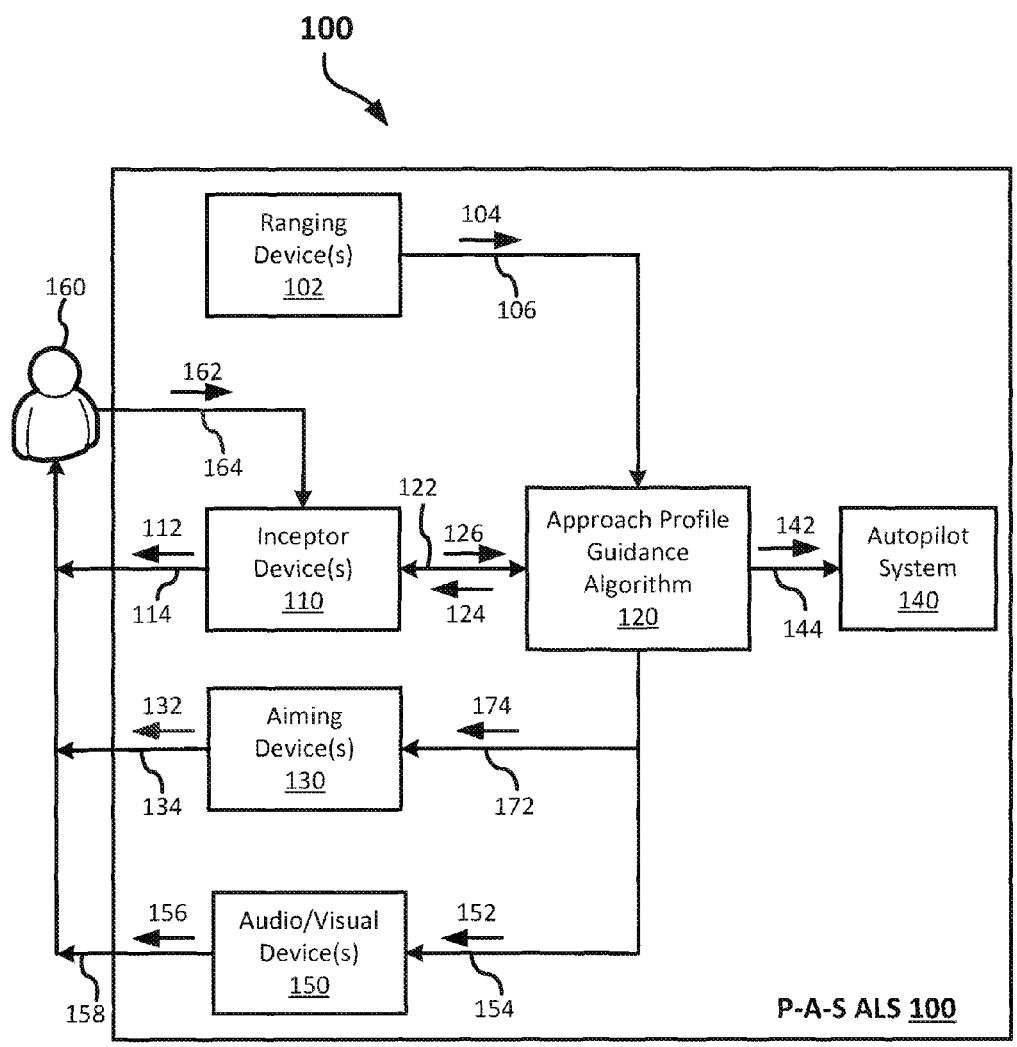
FIG. 1 is a system block schematic diagram illustrating an example of an implementation of a point-and-shoot automatic landing system (P-A-S ALS) in accordance with the present disclosure.

A point-and-shoot automatic landing system ("P-A-S ALS") and method are disclosed. FIG. 1 is a system block schematic diagram illustrating an example of an implementation of a P-A-S ALS 100 in accordance with the present disclosure.

The P-A-S ALS 100 operation may be engaged manually by a force input 162 from a pilot 160 or automatically by the Autopilot System 140. Once the P-A-S ALS is engaged, the Aiming Device(s) 130 are configured to provide a visual indication 132 of the P-A-S ALS aim point over signal path 134. The visual indication 132 of the aim point may be a gimbaled laser pointer viewable outside the aircraft, a camera directed at the aim point for an internal display inside the aircraft, or a mark on an overhead moving map display inside the aircraft. The Aiming Device(s) 130 receive the P-A-S ALS aim point data 174 from the Approach Profile Guidance Algorithm 120 over signal path 172.

Once the Aiming Device(s) 130 provide the pilot 160 with visual indication 132 of the aim point, the pilot 160 may select the desired aim point through force inputs 162 to Inceptor Device(s) 110 over signal path 164 that move an aim point symbol on the gimbaled laser pointer, the internal display, or the overhead moving map display to the desired aim point, whereupon the pilot 160 may then select the aim point. The pilot 160 may also select a desired speed and altitude at the desired aim point through force inputs 162. The Inceptor Device(s) 110 send the Approach Profile Guidance Algorithm 120 aiming commands 126 based on force inputs 162 over signal path 122. The pilot 160 can modify the aim point in this manner at any time once the P-A-S ALS 100 is engaged. The Inceptor Device(s) 110 may be the primary flight controls of an aircraft, a dedicated secondary control joystick, a trackball, a mouse, or a 4-way switch to slew an aim point.

The Ranging Devices 102 provide distance, azimuth and elevation data 104 to the Approach Profile Guidance Algorithm 120 over signal path 106. The Ranging Devices may include a laser range finder, radar range finders, radar altimeters limited to operation over flat terrain and radar altimeters combined with digital terrain elevation. The ranging device may be a single device or a suite of devices.

The Approach Profile Guidance Algorithm 120 uses the aiming commands 126 and the ranging data 104 to calculate an approach profile to the aim point selected by the pilot 160. These calculated approach profiles generated by the Approach Profile Guidance Algorithm 120 may include constant flight path angle, constant vertical speed, constant horizontal deceleration rate or any combination thereof. The calculated approach profile may also include fixed or programmable characteristics, which may include flight path angle, profile vertical speed, vertical deceleration rate, horizontal deceleration rate and vertical speed at touchdown.

Once the desired approach profile is generated, the Approach Profile Guidance Algorithm 120 transmits a plurality of approach profile commands 142 to the Autopilot System 140 over signal path 144, whereupon the Autopilot System 140 commences to automatically control the flight of the aircraft to a desired speed and altitude at the aim point selected by the pilot 160. In an example operation, the Approach Profile Guidance Algorithm 120 computes controls in three to five axes of control for position, altitude, heading and pitch attitude, and the plurality of approach profile commands 142 include distance data, aircraft speed data, aircraft elevation data, and aircraft azimuth data relative to the selected aim point.

The Approach Profile Guidance Algorithm 120 will continuously receive ranging data 104 and aiming commands 126 to generate a plurality of approach profile horizontal and vertical commands 142 that are updated in real-time and transmitted to the Autopilot System 140. This process continues until the aircraft reaches the selected aim point unless the automatically-controlled approach profile is earlier terminated by the pilot 160.

In computing the desired approach profile, the Approach Profile Guidance Algorithm 120 may determine that an approach profile to the selected aim point is not achievable within pre-determined aircraft performance and passenger comfort limits. Examples of aircraft performance limits include engine power, rotor speed, sideslip envelope, and maximum descent rate. Examples of passenger comfort limits include maximum angular accelerations and maximum linear accelerations. The Approach Profile Guidance Algorithm 120 will continuously compute if the approach profile is achievable within these limits.

The Approach Profile Guidance Algorithm 120 may communicate aim point status to the pilot 160 through the Audio/Visual Device(s) 150, the Inceptor Device(s) 110 or the Aiming Device(s) 130.

The Approach Profile Guidance Algorithm 120 may transmit warnings 152 via signal path 154 to Audio/Visual Device(s) 150 to present aural or visual cues 156 via signal path 158 to the pilot 160 that indicate that there is no achievable approach profile and another aim point must be selected. Other cues that may be presented to the pilot 160 by the Approach Profile Guidance Algorithm 120 through the Audio/Visual Device(s) 150 may include distance-to-go and time-to-go to the aim point.

The Inceptor Device(s) 110 may provide tactile cues 112 to the pilot 160 over signal path 114 informing the pilot 160 that a calculated approach profile is not achievable or possible. Such tactile cues may include softstops on or shaking of the flight controls. The Approach Profile Guidance Algorithm 120 may transmit aim point status information 124 to the Inceptor Device(s) 110 via signal path 122.

The Approach Profile Guidance Algorithm 120 may also communicate with the pilot 160 through the Aiming Device (s) 130, which are configured to display the visual indication 132 of the aim point to the pilot 160. The Aiming Device(s) 130 may indicate to the pilot 160 that the calculated approach profile is not achievable. The Aiming Device(s) 130 may also indicate to the pilot 160 the nearest achievable aim point(s), recommended aim points(s), and time-to-go or distance-to-go to aim point(s). The Aiming Device(s) 130 may indicate this information to the pilot 160 through text, color or symbols.

If the pilot 160 wishes to terminate the automatically-controlled flight by the Autopilot System 140 for whatever reason, he may do so at any time through force inputs 162 to the Inceptor Device(s) 110.

The circuits, components, modules, and/or devices of, or associated with, the P-A-S ALS 100 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical, such as, for example, conductive wires, electromagnetic wave guides, cables, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

Figure 2:
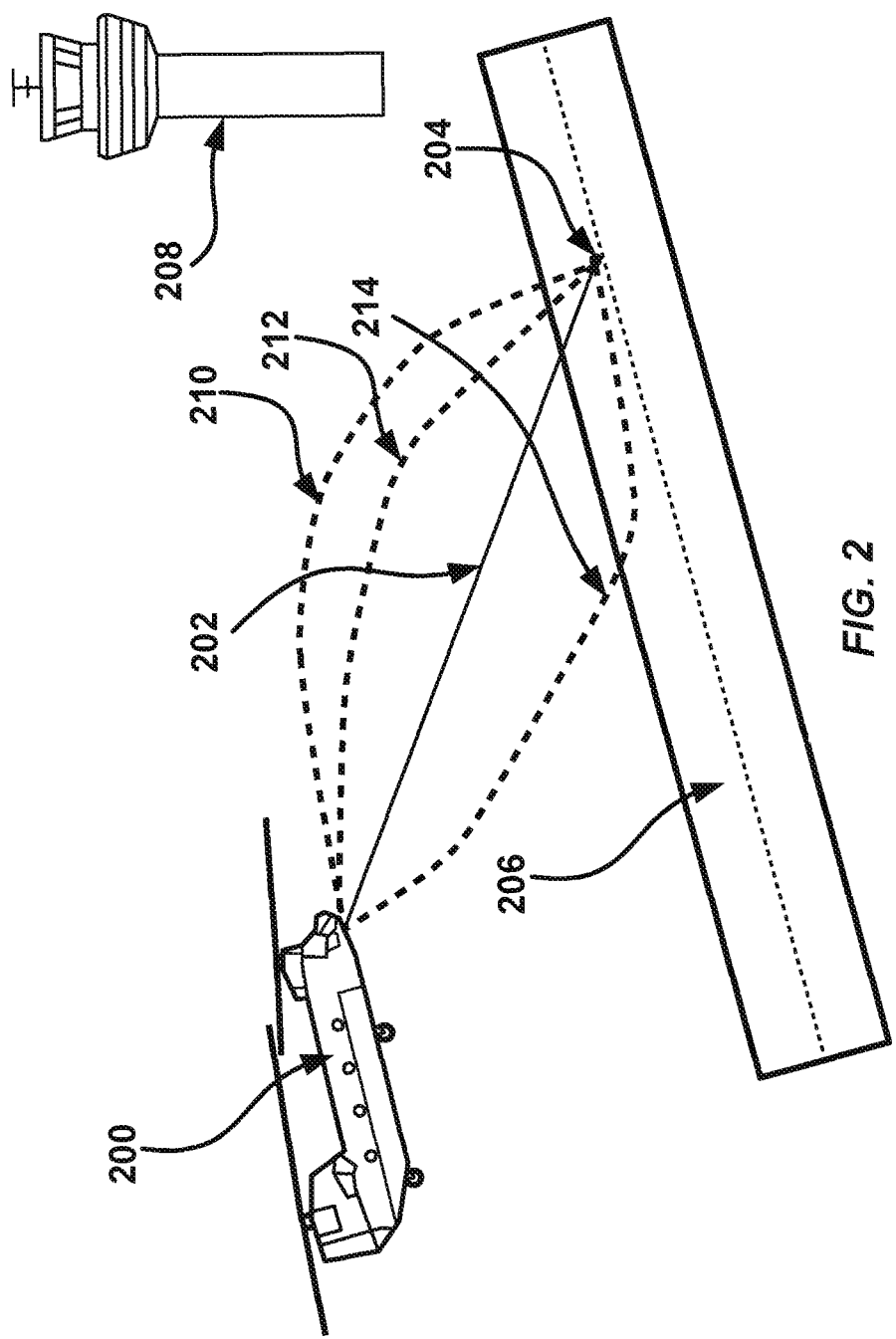
FIG. 2 is a schematic diagram of an aiming device utilizing a gimbaled laser pointer for the pilot to view an aim point outside the aircraft in accordance with the present disclosure.

FIG. 2 is a schematic diagram of an aiming device using a gimbaled laser 202 mounted on the aircraft 200 and viewable outside the aircraft. In this display example the aim point 204 is on a prepared runway 206 in a controlled airspace 208. With a prepared landing surface and controlled airspace, many approach profiles are achievable, which is not always the case for VTOL aircraft. A few example approach profiles 210, 212 and 214 to the aim point 204 are shown.

Figure 3:
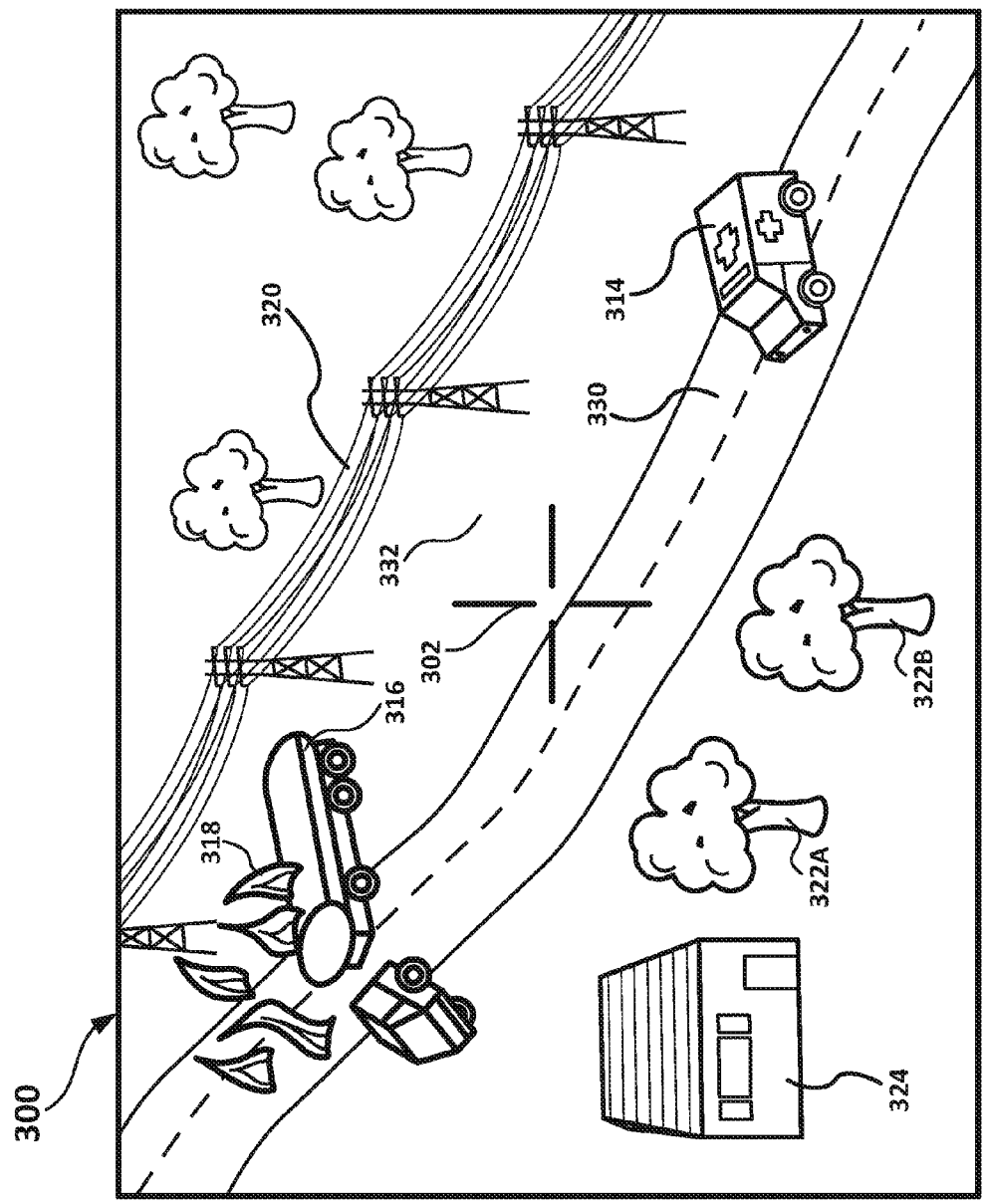
FIG. 3 is a schematic diagram of an aiming device utilizing a multi-function display inside the aircraft to present the pilot with a crosshair symbol superimposed over a camera video of the aim point.

FIG. 3 is a schematic diagram of an aiming device utilizing a multi-function display inside the aircraft with the aim point marked at the center of a crosshair symbol 302 superimposed over a display of an aircraft-mounted camera directed at the aim point. The content displayed in FIG. 3 may include information retrieved from aircraft sensors, helicopter-mounted cameras, radars and any other available sensors. The sensor data can be fused together with information from on-board databases and data links to external sources, such as off-board databases. In this display example, the aircraft is responding to an emergency situation. Pre-planning a detailed approach profile is unlikely in this scenario due to uncertainty of exact aim-point coordinates and exact object locations within the landing zone. While the location and required clearance height of some stationary obstacles, such as power lines 320, trees 322A and 322B, and housing structure 324, may be known in advance, the exact location and clearance height of moving obstacles such as the ambulance 314, truck 316 or fire 318 would not be known until observing the area. These obstacles may eliminate the use of a pre-programmed approach, requiring a piloted approach to an unprepared landing surface 332 where slope and dust conditions pose safety risks and may reduce mission effectiveness. With the P-A-S ALS system, the pilot only has to select an aim point, e.g., unprepared landing surface 332, using crosshair symbol 302, which is a safe distance from obstacles, and the system will automatically land the aircraft at unprepared landing surface 332. If the situation requires the pilot to change the original aim point, the pilot can change the aim point with only force inputs 162 to Inceptor Device(s) 110, FIG. 1.

Figure 4:
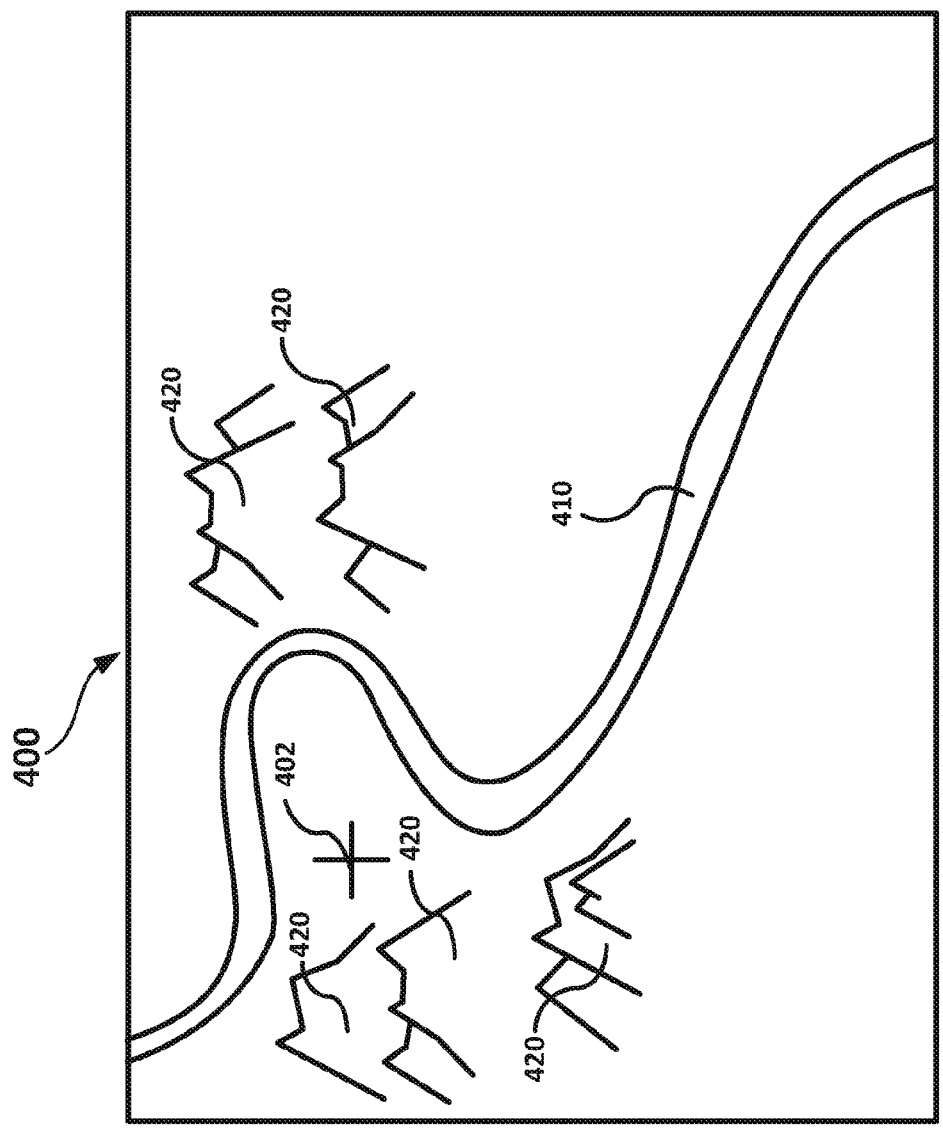
FIG. 4 is a schematic diagram of an aiming device utilizing an overhead moving map with an aim point symbol.

FIG. 4 is a schematic diagram of an aiming device utilizing an overhead moving map with crosshair 402 marking the aim point. The Moving Map Display 400 shows a portion of an overhead moving map selected by the pilot. The Moving Map Display 400 shows a river 410 and several mountains 420 which must be avoided. In some cases, as the pilot approaches the aim point, it may be necessary for the pilot to switch from an overhead moving map display to a display that shows the aim point in greater detail, e.g., a visual display like FIG. 3. In any situation, the pilot may use force inputs to select a new aim point in order to complete his assigned mission.

Figure 5:
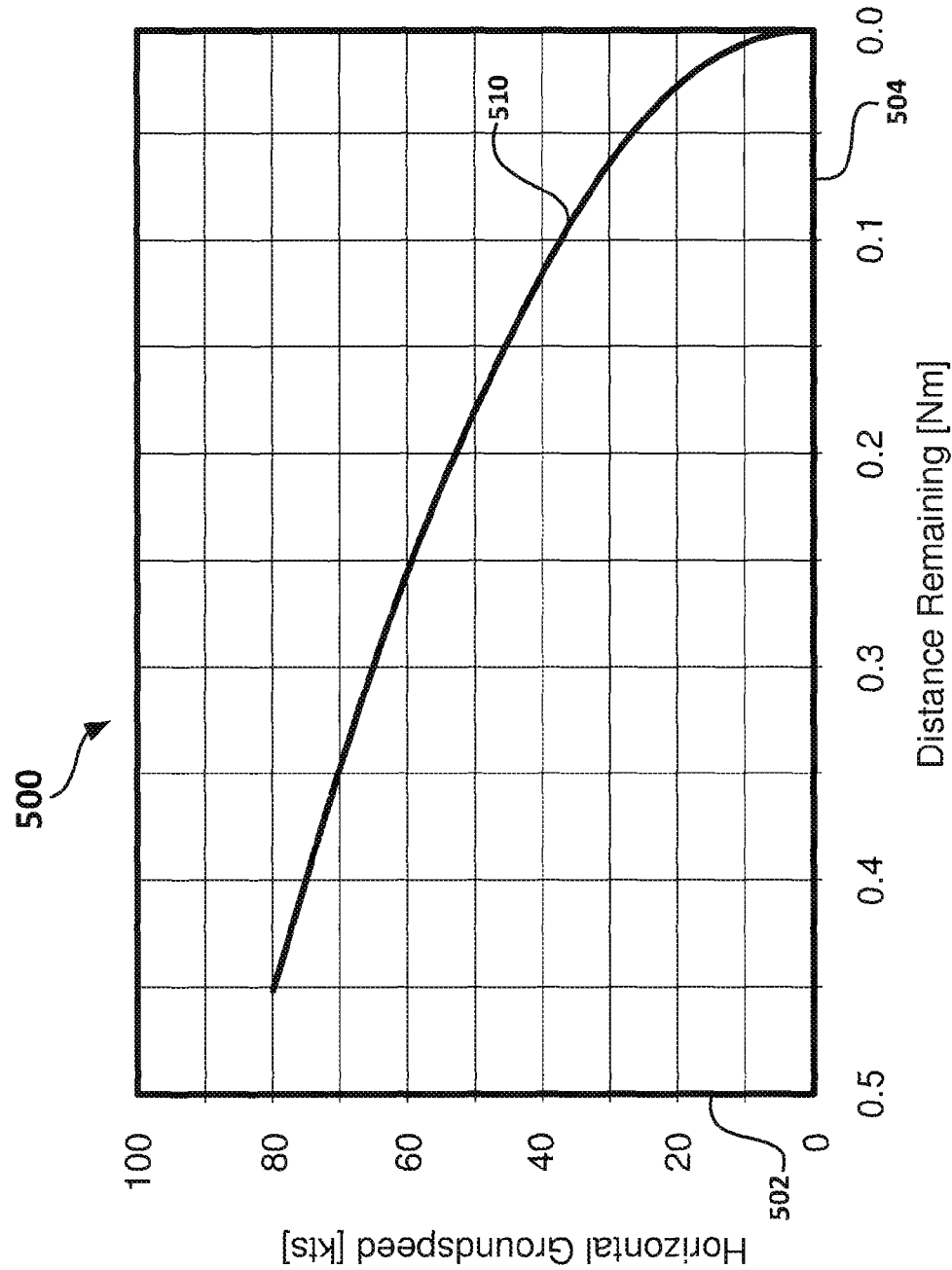
FIG. 5 is a graph of a horizontal approach profile in accordance with the present disclosure that uses ranging device distance remaining data and a constant deceleration rate in horizontal groundspeed to command horizontal groundspeed.

FIG. 5 is a graph of a horizontal approach profile in accordance with the present disclosure that uses ranging device distance remaining data and a constant deceleration rate in horizontal groundspeed to calculate desired horizontal groundspeed where the y-axis 502 of graph 500 represents horizontal groundspeed (in knots) and the x-axis 504 represents horizontal distance of an aircraft to an aim point (in nautical miles). Profile 510 represents a horizontal approach profile in accordance with the present disclosure, such that the horizontal groundspeed of the aircraft is decelerating at a constant rate as the aircraft approaches the aim point.

Figure 6:
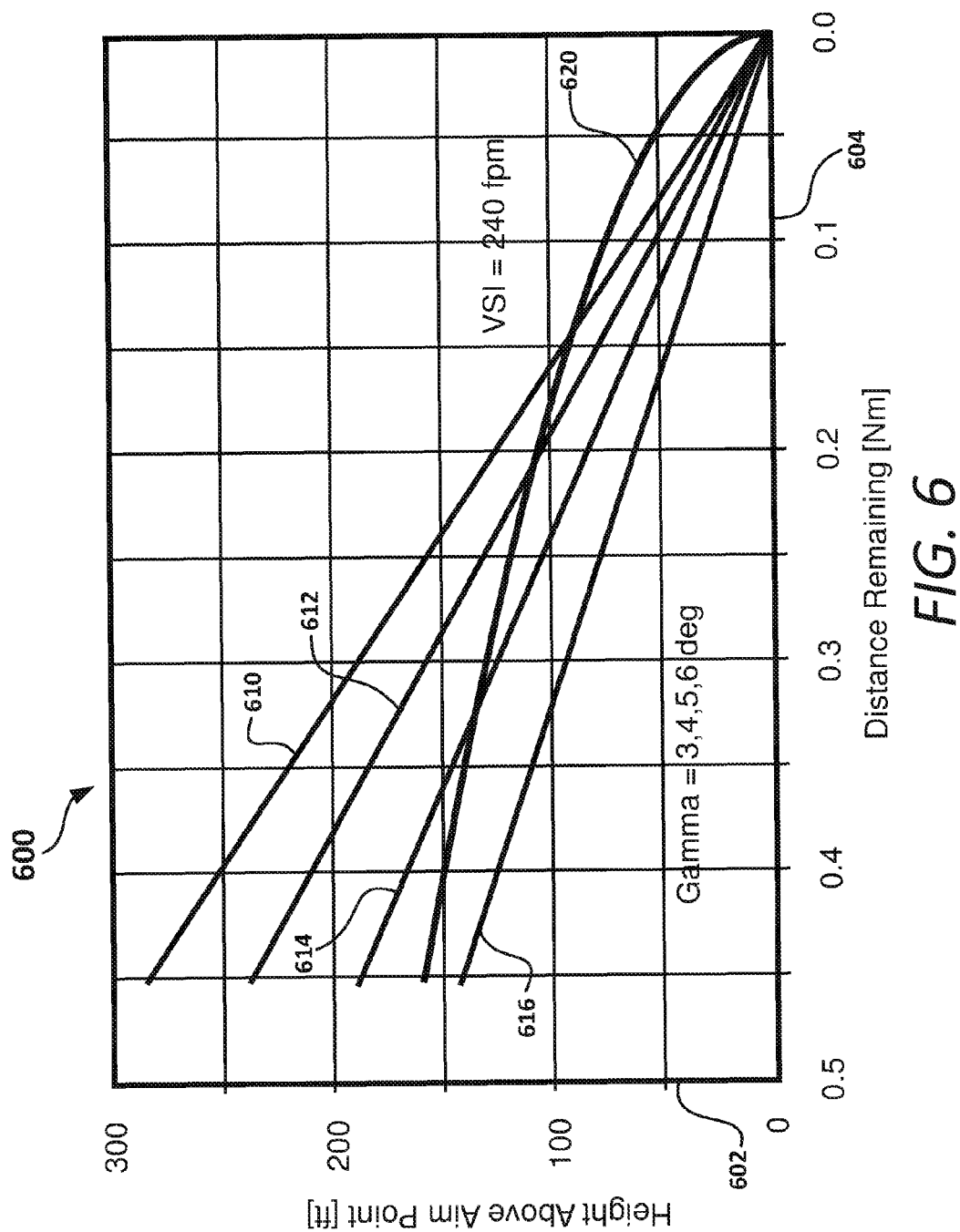
FIG. 6 is a graph of several possible vertical approach profiles using ranging device distance remaining and elevation data to command vertical speed.

FIG. 6 is a graph of several possible vertical approach profiles using ranging device distance remaining and elevation data to calculate desired vertical speed. Graph 600 shows Height-Above-Aim-Point (in feet) on the y-axis 602 versus distance remaining to an aim point (in nautical miles) on the x-axis 604. Profiles 610, 612, 614, and 616 represent constant flight path angle approaches at angles of 3, 4, 5, and 6°, respectively. Profile 620 represents a constant vertical speed approach of 240 feet-per-minute sink rate.

Figure 7:
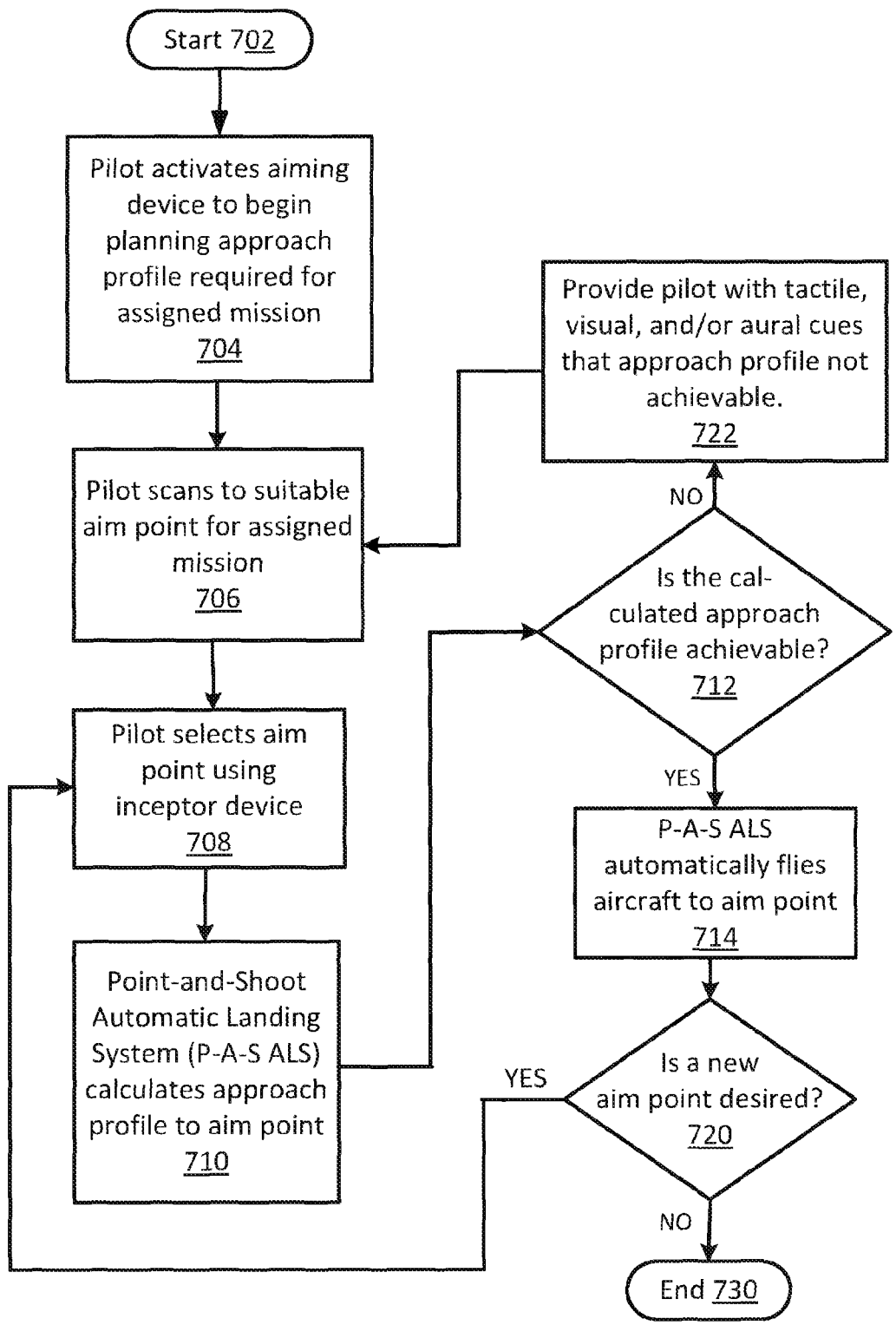
FIG. 7 is a flow diagram of an example of a process whereby a pilot of an aircraft selects an aim point on a display using flight controls and a P-A-S ALS in accordance with the present disclosure and determines an approach profile to the selected aim point.

FIG. 7 is a flow diagram of an example of a process whereby a pilot of a VTOL aircraft selects an aim point with a P-A-S ALS, which automatically calculates an approach profile to the selected aim point and allows an Autopilot System to automatically fly the aircraft along the calculated approach profile in accordance with the present disclosure. Starting at step 702, the pilot selects a display with which to begin planning an approach profile for his assigned mission in step 704. Generally, the pilot will have numerous displays available to him in his aircraft, where these displays may provide real-time images and/or data received from on-board aircraft sensors, on-board aircraft radars, on-board aircraft cameras, on-board aircraft databases, and data links connected to off-board databases, and where the displays may include any type of multi-function display (MFD) such as overhead moving map displays, heads-down displays, heads-up displays, and helmet displays.

In step 706, the pilot, using flight control inputs, may view the selected display and search for a suitable aim point for the assigned mission. Once satisfied with the aim point, the pilot selects the aim point in step 708. The aim point may be selected by the pilot placing a symbol, such as a crosshair or aircraft icon, of the display on the desired aim point and clicking or pressing a button.

In step 710, the P-A-S ALS automatically calculates an approach profile to the aim point. The desired approach profile parameters may be fixed, may be programmable, or may have been selected earlier. In decision step 712, the P-A-S ALS determines if the approach profile is achievable. If the approach profile is achievable, the process continues to step 714, where the P-A-S ALS commences to automatically fly the aircraft to the selected aim point using the approach profile calculated by the P-A-S ALS. In decision step 720, at any time during the automatically-controlled flight, the pilot has the option to terminate the flight and select a new aim point. If the pilot chooses this option, the process returns to step 706. An approach profile guidance algorithm continuously updates the approach profile at step 710 and confirms that the approach profile is achievable in decision step 712. As more information is collected by the sensors of the P-A-S ALS, it may be determined that the approach profile is no longer achievable in decision step 712. Once the aim point is reached, the automatically-controlled flight is terminated 730.

Returning to decision step 712, if the P-A-S ALS determines the approach profile is not achievable, the process proceeds to step 722, where the P-A-S ALS may provide the pilot with tactile, visual or aural cues that inform the pilot that the selected aim point is not achievable. The process then returns to step 706, where the pilot can reinitiate the process.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

What is claimed is:

1. A point-and-shoot automatic landing system ("P-A-S ALS") for use in an aircraft, the P-A-S ALS comprising:
    an inceptor device in signal communication with a pilot of the aircraft, configured to receive force inputs from the pilot that command movement and selection of an aim point, wherein a selected aim point is generated by the pilot;
    an aiming device configured to display to the pilot an aim point symbol superimposed upon an internal display or a view outside the aircraft;
    one or more ranging devices configured to determine a distance, azimuth, and altitude of the aircraft relative to the selected aim point;
    an approach profile guidance algorithm in signal communication with the inceptor device, the aiming device, and the one or more ranging devices, whereby the approach profile guidance algorithm is configured to generate a plurality of calculated approach profiles comprising approach profile commands that include distance data, aircraft speed data, aircraft elevation data, and aircraft azimuth data relative to the selected aim point;

an autopilot system in signal communication with the approach profile guidance algorithm, wherein the autopilot system is configured to automatically control flight of the aircraft to the selected aim point utilizing the approach profile commands of the plurality of calculated approach profiles; and one or more devices that communicate to the pilot information about the selected aim point and status of the plurality of calculated approach profiles to the selected aim point.

2. The P-A-S ALS of claim 1, wherein the inceptor device is selected from the group consisting of the primary flight controls of an aircraft, a dedicated secondary control joystick, a trackball, a mouse, and a 4-way switch to slew the selected aim point.

3. The P-A-S ALS of claim 2, wherein the plurality of approach profile commands comprises horizontal commands updated in real-time, including a commanded groundspeed along the calculated approach profile to the selected aim point.

4. The P-A-S ALS of claim 3, wherein the plurality of approach profile commands further comprises vertical commands updated in real-time, comprising a commanded vertical speed and/or altitude along the calculated approach profile to the selected aim point.

5. The P-A-S ALS of claim 1, where the one or more ranging devices are selected from the group consisting of laser range finders, radar range finders, radar altimeters limited to operation over flat terrain, radar altimeters combined with digital terrain elevation data, and a combination of any of the foregoing.

6. The P-A-S ALS of claim 1, wherein the aiming device is selected from the group consisting of a gimbaled laser pointer viewable outside the aircraft, a camera directed at the aim point for display inside the aircraft, and a mark superimposed on the internal display or the view outside the aircraft.

7. The P-A-S ALS of claim 6, wherein the display is a multi-function display (MFD).

8. The P-A-S ALS of claim 7, wherein information presented on the display is obtained from the group consisting of on-board aircraft sensors, on-board aircraft radars, on-board aircraft cameras, on-board aircraft databases, and data links to off-board databases.

9. The P-A-S ALS of claim 1, wherein the force inputs comprise selection of the aim point displayed by the aiming device.

10. The P-A-S ALS of claim 1, wherein the force inputs comprise flight controls that allow the pilot to change the selected aim point at any time or to terminate the automatically-controlled flight of the aircraft along the calculated approach profile.

11. A method of automatically controlling an approach profile of an aircraft to a landing at an aim point, the method comprising:

selecting the aim point from information displayed inside or viewable outside the aircraft using an aiming device to provide a selected aim point;

utilizing data from one or more ranging devices and one or more displays of the aircraft to determine distance, azimuth, and elevation of the aircraft relative to the selected aim point;

automatically calculating the approach profile comprising horizontal and vertical commands for controlling flight of the aircraft along the approach profile to the selected aim point and generating a calculated approach profile; and transmitting the calculated approach profile to an autopilot system to automatically control flight of the aircraft to a desired speed and altitude at the selected aim point.

12. The method of automatically controlling an approach profile of an aircraft of claim 11, where the one or more ranging devices are selected from the group consisting of laser range finders, radar range finders, radar altimeters limited to operation over flat terrain, radar altimeters combined with digital terrain elevation data, and a combination of any of the foregoing.

13. The method of automatically controlling an approach profile of an aircraft of claim 11, wherein information presented on a display of the one or more displays of the aircraft is obtained from the group consisting of on-board aircraft sensors, on-board aircraft cameras, on-board aircraft radars, on-board aircraft databases, and data links connected to off-board databases.

14. The method of automatically controlling an approach profile of an aircraft of claim 11, wherein the calculated approach profile comprises a plurality of horizontal and vertical commands updated in real-time.

15. The method of automatically controlling an approach profile of an aircraft of claim 11, wherein selecting the aim point comprises:

displaying to a pilot of the aircraft an aim point symbol superimposed upon a display of the one or more displays or a view outside the aircraft; and moving the aim point symbol to a desired aim point on the display to select the desired aim point.

16. The method of automatically controlling an approach profile of an aircraft of claim 15, wherein selecting the aim point further comprises:

determining that there is no achievable approach profile to the selected aim point for the aircraft; and providing the pilot with warnings that there is no achievable approach profile for the aircraft.

17. The method of automatically controlling an approach profile of an aircraft of claim 11, further including the steps of:

terminating the automatically-controlled flight of the aircraft along the calculated approach profile; and selecting a second aim point from the information displayed on a display of the one or more displays.

18. The method of automatically controlling an approach profile of an aircraft of claim 11, wherein a display of the one or more displays is a multi-function display (MFD).

19. The method of automatically controlling an approach profile of an aircraft of claim 11, wherein the aiming device is a symbol on a display of the one or more displays or a view outside the aircraft that may be manipulated by a pilot using primary flight controls of the aircraft.

20. The method of automatically controlling an approach profile of an aircraft of claim 11, wherein the calculated approach profile may be controlled to a landing at the selected aim point, to hovering above the selected aim point, or to tracking a moving aim point.

* * * * *